(12) United States Patent
Duncan (10) Patent No.: US 6,430,919 B1
(45) Date of Patent: Aug. 13, 2002

(54) SHAPED CHARGED ENGINE (75) Inventor: Ronnie J. Duncan, Entiat, WA (US)

(73) Assignee: Direct Propulsion Devices, Inc., Wenatchee, WA (US)

( * ) Notice: Subject to any disclaimer, the term of this patent is extended or adjusted under 35 U.S.C. 154(b) by 0 days.

(21) Appl. No.: 09/517,130

(22) Filed: Mar. 2, 2000

(51) Int. Cl.$^7$ ............................................... F02K 7/02
(52) U.S. Cl. ........................ 60/39.76; 60/247; 60/746
(58) Field of Search ............................. 60/39.76, 247, 60/733, 746, 747, 491

(56) References Cited

U.S. PATENT DOCUMENTS

| | | | | |
|---|---|---|---|---|
| 864,821 A | * | 9/1907 | Zoelly ........................ 60/39.76 |
| 2,810,261 A | * | 10/1957 | Trowbridge ................... 60/746 |
| 2,951,339 A | * | 9/1960 | Benson ........................ 60/747 |
| 3,175,357 A | * | 3/1965 | Klein ........................ 60/39.76 |
| 3,185,871 A | * | 5/1965 | Bodine ....................... 60/39.76 |
| 4,034,673 A | | 7/1977 | Schnieder, Jr. ................ 102/56 |
| 4,074,858 A | | 2/1978 | Burns et al. .................. 239/172 |
| 4,170,110 A | | 10/1979 | Radin .......................... 60/204 |
| 4,505,649 A | | 3/1985 | Masuda et al. ................ 417/300 |
| 4,510,748 A | | 4/1985 | Adams ........................ 60/39.02 |
| 4,712,747 A | | 12/1987 | Metz et al. ................... 244/3.22 |
| 4,724,738 A | | 2/1988 | Johnson |
| 4,726,184 A | | 2/1988 | Russell ....................... 60/247 |
| 4,765,146 A | * | 8/1988 | Hellat et al. .................. 60/746 |
| 4,805,411 A | * | 2/1989 | Hellat et al. .................. 60/746 |
| 4,840,164 A | | 6/1989 | Parsons ..................... 123/559.1 |
| 4,917,596 A | | 4/1990 | Saito .......................... 431/1 |
| 4,938,112 A | | 7/1990 | Hertzberg et al. .............. 89/7 |
| 5,052,176 A | | 10/1991 | Labatut et al. ................ 60/225 |
| 5,090,891 A | | 2/1992 | Hemsath ....................... 431/1 |
| 5,111,746 A | | 5/1992 | Pentel et al. .................. 102/308 |
| 5,159,809 A | | 11/1992 | Ciais et al. ................... 60/225 |
| 5,275,355 A | | 1/1994 | Grosswendt et al. ........... 244/3.22 |
| 5,303,633 A | | 4/1994 | Guthrie et al. ................. 89/8 |
| 5,363,766 A | | 11/1994 | Brandon et al. .............. 102/374 |
| 5,513,489 A | | 5/1996 | Bussing ..................... 60/39.38 |
| 5,537,815 A | | 7/1996 | Marguet et al. ............... 60/224 |
| 5,557,926 A | | 9/1996 | Hunter, Jr. et al. ............ 60/247 |
| 5,572,864 A | | 11/1996 | Jones ........................ 60/220 |
| 5,797,260 A | * | 8/1998 | Koppel et al. ................ 60/247 |
| 5,831,155 A | | 11/1998 | Hewitt ....................... 73/117.4 |
| 5,873,240 A | | 2/1999 | Bussing et al. ................ 60/207 |
| 5,890,459 A | | 4/1999 | Hedrick et al. ............... 123/27 |
| 5,901,550 A | | 5/1999 | Bussing et al. .............. 60/39.38 |
| 6,000,214 A | | 12/1999 | Scragg ...................... 60/39.38 |
| 6,003,301 A | | 12/1999 | Bratkovich et al. ............ 60/204 |

* cited by examiner

*Primary Examiner*—Michael Koczo
(74) *Attorney, Agent, or Firm*—Black Lowe & Graham PLLC (57) ABSTRACT

A shaped charge engine includes an annular blast-forming chamber formed by joining inner and outer housings. A central through hole in the inner housing allows exhaust gases to exit. The outer housing comprises a generally round disk with an inner conical concave depression and through holes for the insertion of fuel and ignition. The blast chamber is preferably taper-conical in shape, wider at the base, and gradually decreasing in cross-sectional area as it rises to the apex. This construction forms a circular pinch point or throat toward the apex that produces a primary or first stage compression area. A secondary compression zone is created at the apex of the outer housing, just beyond the throat, producing hypersonic gases as generally opposing exhaust streams collide and are forced to exit the through hole in the inner housing. The shaped charge engine may be used in a variety of applications, including as a pulsed direct propulsion device, as a turbine driver, or in a wide array of tools and appliances.

16 Claims, 7 Drawing Sheets

SHAPED CHARGED ENGINE

FIELD OF THE INVENTION

The present invention relates to pulsed hypersonic compression waves and more particularly to shaped charge devices using pulsed hypersonic compression waves to create thrust.

BACKGROUND OF THE INVENTION

In propulsion devices such as jet engines and rocket engines, propulsion thrust is obtained by high-speed exhaust flows. Conventional jet engines obtain the high-speed exhaust by combustion products of fuel and air, while rocket engines obtain the high-speed exhaust by internal combustion products of fuel and oxidizer. The high pressure combustion products are forced through a restrictive orifice, or nozzle, to obtain the high-speed exhaust flow.

Several problems are inherent in the conventional systems. The combustion in both jet and rocket engines must contain extremely high internal pressures and are therefore limited by construction material strength. As the internal combustion pressure increases, the combustion chamber wall must increase in thickness to contain the pressure, increasing the combustion chamber weight proportionally and limiting the design. Also, as the exhaust nozzle diameter is reduced to increase exhaust speed, cooling the engine and nozzle becomes increasingly more difficult. In addition, pulsed engines are unable to evacuate the combustion products in a short time moment, thus limiting the firing speed.

Furthermore, as internal pressure in the combustion chamber increases, higher fuel and oxidizer inlet pressures are required to introduce fuel and oxidizer into the combustion chamber, requiring heavier weight pumps that operate at higher horsepower. One example of such limitations on present engines is seen in the phase two main space shuttle engine. The engine requires 108,400 horsepower to drive the fuel and oxidizer pumps alone. Inlet pressures exceed 6,800 psi in order to obtain an internal combustion chamber pressure to only 3,260 psi with a combustion chamber to nozzle ratio of 77 to 1.

The huge plume of fire trailing the shuttle and other rockets is caused by incomplete combustion of the fuel and oxidizer prior to exiting the exhaust nozzle. The fuel and oxidizer igniting outside the engine provide virtually no thrust and are thus wasted. The above space shuttle engine example requires 2,000 pounds of fuel and oxidizer per second to obtain 418,000 pounds thrust at sea level. Furthermore, the continuous ignition of present engines causes high heat transfer to engine parts, particularly the nozzle orifice, and the high heat transfer requires the use of costly exotic materials and intricate cooling schemes to preserve the engine structure.

Prior efforts to improve the engine design focus on various components, including the nozzle. For example, U.S. Pat. No. 6,003,301 to Bratkovich et al., entitled "Exhaust Nozzle for Multi-Tube Detonative Engines" teaches the use of a nozzle in an engine having multiple combustor tubes and a common plenum communicating with the combustor tubes. Accordingly, Bratkovich et al. teach that the common plenum and a compound flow throat cooperate to maintain a predetermined upstream combustor pressure regardless of downstream pressure exiting the expansion section.

While the prior art addresses many aspects of propulsion devices, it does not teach the use of a shaped charge in a jet or rocket engine. A shaped charge is generally defined as a charge that is shaped in a manner that concentrates its explosive force in a particular direction. While the general theory behind shaped charges has been known for many years, the prior art has restricted the use of shaped charges to warheads and certain other expendable detonation devices. In a typical warhead, the shaped charge directs its explosive forces forwardly, in the direction the warhead is traveling, by igniting moments before or substantially simultaneously with impact. The highly concentrated force can be used to create a cheap, lightweight armor-piercing device. Examples of shaped charge devices are described in U.S. Pat. No. 5,275,355 to Grosswendt, et al., entitled "Antitank Weapon For Combating a Tank From The Top," and U.S. Pat. No. 5,363,766 to Brandon, et al., entitled, "Ramjet Powered, Armor Piercing, High Explosive Projectile." Shaped charges in such devices are not used to provide propulsion.

Similarly, current engines configured to drive a turbine do not employ shaped charge engines. One example of a pulsed turbine engine is disclosed in U.S. Pat. No. 6,000,214 to Scragg, entitled "Detonation Cycle Gas Turbine Engine System Having Intermittent Fuel and Air Delivery." Scragg teaches a detonation cycle gas turbine engine including a turbine rotor within a housing. Valveless combustion chambers are positioned on either side of the rotor to direct combustion gases toward the turbine blades. The two combustion chambers alternately ignite the mixture of fuel and oxidizer to cyclically drive the turbine. While Scragg discloses a useful engine, efficiency, horsepower per unit of engine weight, and other performance parameters could be greatly improved. For example, the Scragg device constructed to deliver 200 hp would require a 560 cubic inch combustion chamber and would weigh 262 pounds, while a 200 hp engine using a shaped charge as in the present invention would require a combustion chamber of only 18 cubic inches and would weigh only 70 lbs.

There is therefore a need for a shaped charge propulsion device that provides substantially improved performance than prior art devices.

SUMMARY OF THE INVENTION

The present invention provides a shaped charge engine that overcomes many limitations of the prior art. The apparatus includes a blast-forming chamber comprising an inner annular charge forming housing having a conical convex projection that forms the inner walls of the blast-forming chamber. A central through hole is provided to allow exhaust gases to exit. An outer housing comprises a generally round disk with an inner conical concave depression and through holes for the insertion of fuel and ignition. The two housings are joined by conventional means such as welding or bolts. The resulting chamber formed by joining the two housings is taper-conical in shape, wider at the base, and gradually decreasing in cross-sectional area as it rises to the apex. This construction forms a circular pinch point or throat toward the apex that forms the primary or first stage compression area. A secondary compression zone is created at the apex of the outer housing, just beyond the throat. Hypersonic gases exit the through hole in the inner housing.

In accordance with further aspects of the invention, a directed thrust is formed in a pulsed manner using a contained burn that starts at a peripheral base area and is directed in a tapered-conical shape that forms a primary compression area adjacent the apex of the conical shape. The compressed burn thereafter continues to the apex of the tapered-conical shape, creating a high-speed convergence or secondary compression zone before being exhausted. This construction provides a more complete ignition within the chamber, enhancing efficiency by capturing more of the energy before it leaves the engine. It also allows for the combustion products to exit the primary combustion chamber more rapidly, thus allowing a higher pulse rate of firing while maintaining the high compression exhaust flows by not compressing exhaust products to final velocity internally.

In accordance with other aspects of the invention, the engine includes a sensor to determine the ambient air density, allowing the engine to selectively consume air or oxidizers, as appropriate.

In accordance with still further aspects of the invention, inexpensive conventional fuels, such as gasoline, acetylene, butane, propane, natural gas, and diesel oil are mixed with air or an oxidizer into a combustible mixture and infused under positive pressure into the hollow blast-forming chamber in a manner that permits positive shutoff between a series of induction cycles to accommodate ignition cycles.

In accordance with yet other aspects of the invention, an igniter ignites the combustible mixture initiating a blast wave or pulse at the base of the hollow blast-forming chamber. As the blast wave or pulse advances into a gradually compressed blast-forming chamber, additional mass may be injected into the blast chamber, thereby increasing the momentum of the blast wave. Explosion products are compressed by the gradually decreasing cross sectional area of the blast-forming chamber. The increasing pressure drives the blast wave into a primary compression zone formed by an annular restriction between the truncated end of a central conical projection and an opposing truncated hemispherical or domed inner surface of the outer housing.

Compression of the blast wave into this annular restriction creates a high-speed radial flow of explosion products toward the center of the truncated hemispherical or domed surface. The opposing high-speed radial streams of explosion products converge at the center of the truncated hemispherical or domed surface creating a secondary zone of increased compression of the explosion products. Confluence of mass and kinetic energy in the secondary compression zone forms the explosion products into hypersonic gases that exit in a controlled blast directed through an exhaust port centrally located at the apex of the central conical projection. The resulting high pressure hypersonic exhaust is expelled in a directed blast from the exhaust port without the need for an exit nozzle.

In accordance with still another aspect of the invention, the exit velocity of the combustion products and ejecta is controlled by increasing or decreasing the size, length, diameter, and depth angle of the blast chamber, and adjusting fuel-oxidizer mixtures.

In accordance with still further aspects of the invention, the controlled blasts formed in the blast-forming chamber are repeatable by the serial infusion and ignition of additional charges of the combustible mixture. Furthermore, in repeating pulsed modes, the blast power and frequency are throttle controllable by increasing or decreasing the flow rate of the combustible mixture or adjusting the cycle rate independently of the mixture flow rate.

In accordance with yet another aspect of the invention, the engine is operated in a pulsed mode along a continuum between an aerobic or air-breathing jet mode and an anaerobic or non-air-breathing rocket mode. Accordingly, fuel is mixed with air, oxidizer, or any combination of the two in any relative concentration. The relative concentrations of air and oxidizer in the combustible mixture is dynamically adjusted into a blend of air and oxidizer, which may be a function of oxygen concentration in the ambient atmosphere.

In accordance with further aspects of the invention, the particular geometry of the shaped charge engine may be varied, while still retaining the inventive aspects, including primary and secondary convergence zones. Accordingly, the cross-sectional shape may be annular, square, rectangular, triangular, or a variety of other forms depending on the desired results and the space available to house the engine in the vehicle to be propelled.

In accordance with still further aspects of the invention, the exhaust gases collide at a secondary convergence zone to create hypersonic exhaust. The opposing streams of gases may originate in chambers that are substantially opposite one another and at least partially orthogonal to the direction of travel. Alternatively, the blast chamber may be configured such that the explosive products travel in an acute or an obtuse angle with respect to the direction of travel before reaching the throat and the secondary compression zone.

In accordance with additional aspects of the invention, the angle at which the exhaust gases converge may be dynamically controlled during operation of the engine. The generally opposed sides of the generally annular blast-forming chamber may be hinged to allow the chambers to be moved fore and aft to adjust the angle of convergence.

In accordance with yet other aspects of the invention, the cross-sectional area of the throat or pinch point may be increased or decreased. By decreasing the size of the throat area, the exhaust gases travel at a higher velocity, creating a relative spike in the exhaust velocity and therefore the thrust. Conversely, by increasing the throat size, the exhaust gases exit more uniformly and at a lower relative velocity.

In accordance with other aspects of the invention, the engine may be used to provide direct thrust to propel a rocket, aircraft, personal water craft, or other vehicle.

In accordance with still other aspects of the invention, the exhaust gases created by the engine may be used to drive a turbine that is used to propel the vehicle. In such an embodiment, the engine may, for example, be used to power a car.

In accordance with still further aspects of the invention, the pressure, exhaust, pulse, or heat produced by the shaped charge engine may be used in a wide variety of applications, including, for example, vehicle propulsion, pest control, demolition, cutting tools, etching tools, heating tools, spraying tools, high-speed guns, generators, boilers, and closed-system pressure devices.

BRIEF DESCRIPTION OF THE DRAWINGS

The preferred embodiment of the present invention is described in detail with reference to the following drawings.

DETAILED DESCRIPTION OF THE PREFERRED EMBODIMENT

General Construction of the Shaped Charge Engine.

Figure 1:
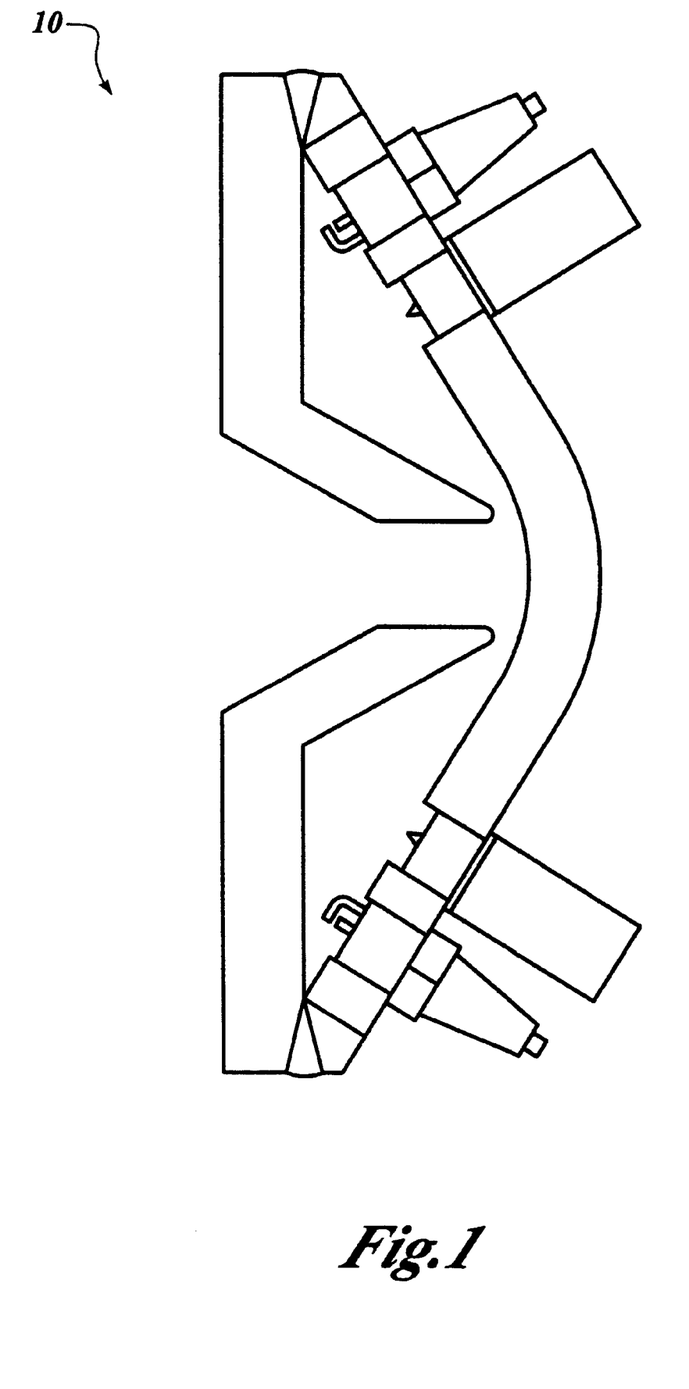
FIG. 1 is a cross-sectional view of a shaped charge engine, including a blast-forming chamber, formed in accordance with a preferred embodiment of the present invention.

FIG. 1 schematically illustrates in cross-section a device constructed in accordance with the present invention for dynamically compressing and detonating a combustible mixture to form a shaped compression wave. Reference numeral 10 generally refers to a shaped charge engine. The engine 10 includes a hollow blast-forming chamber 3 formed between an outer charge forming housing 2 and an inner charge forming housing 1. The outer charge forming housing 2 is generally round-conical in shape and includes a centrally located dome shaped portion at the apex to form a concave "cup" or "bowl" shape.

The inner charge forming housing 1 comprises a generally flat plane transitioning to a centrally located generally conical-shaped projection 7. The projection 7 extends radially inward and upward toward the outer housing 2. The projection 7 is truncated below the tip to form a centrally located generally circular opening at the smaller end of the cone which is nearest the outer housing 2 when the inner housing 1 and outer housing 2 are joined. From the perspective of exhaust gases E traveling from the tip of the projection 7 through the opening and out the engine, the projection 7 thus forms a generally cylindrical opening that flares outward into a generally conical opening at the exit.

The inner charge forming housing 1 is joined to the outer charge forming housing 2 so that the projection 7 extends toward the outer housing 2. The outer charge forming housing 2 and inner charge forming housing 1 are joined along their respective outer peripheral edges to form hollow blast-forming chamber 3 in the space between the inner housing 1 and outer housing 2. The inner and outer charge forming housings 1 and 2 are joined, for example, by a weld 6, or by other compression means such as bolts or rivets.

The housings 1 and 2 are formed of materials capable of withstanding the heat and pressure of the ignition, detonation, and compression of the controlled combustion. Any of a variety of materials typically used in the construction of rocket engines may be used for the present invention, including, for example, steel, stainless steel, or titanium. Preferably, the material of inner charge forming housing 1 is sufficiently thick to withstand the heat and pressure without external support.

A plurality of fuel injectors 5 and igniters 4 project through the outer housing 2 and into the chamber 3. The injectors 5 infuse fuel, air, and oxidizer into hollow blast-forming chamber 3. The preferred combustible mixture is, for example, formed of any conventional fuel that, when mixed with air, oxidizer, or a combination of both, forms a combustible mix. The fuel is optionally any airborne combustible material such as Hydrogen or other flammable gases; an inexpensive liquid spray such as butane, propane, gasoline, acetylene, or natural gas; a combination of vapor and liquid drops such as diesel oil; airborne solid particles; or another combustible mixture that burns rapidly enough to accomplish dynamic compression and detonation. The fuel is preferably mixed with a proportioned amount of air or oxidizer for complete combustion.

The igniter 4 is, for example, a conventional spark plug powered by a spark generator, glow-plug, piezo-electric spark gap or another suitable ignition device. In accordance with alternate embodiments of the invention, the igniter 4 is a hot plasma jet generated by a plasma jet generator (not shown) and directed into the ignition region of the hollow blast-forming chamber 3. Other fast and reliable devices for injecting flames or sparks essentially instantaneously into the ignition region are within the scope of the present invention as alternative ignition devices.

While the injector and igniter are preferably constructed such that they project through the outer housing 2 into the blast-forming chamber, either or both of the injector 5 and igniter 4 may be peripherally mounted in the inner charge forming housing 1 or in the space separating the inner and outer housings 1 and 2 (i.e., along the weld 6), so long as they extend into the ignition region of the hollow blast-forming chamber 3.

The combustible mixture injector 5 is any conventional injection system suitable for providing a controllable flow of the combustible mixture, including, for example, conventional fuel injectors and carburetors. Conventional carburetors used in conjunction with turbochargers allow the mixing of a wide variety of fuels with air for injection into the hollow blast-forming chamber 3.

The timing of the fuel injection and ignition, and therefore the timing of the combustion, is controlled by a control system (not shown) including fuel, air, and oxidizer valves. A valve port is formed at the combustible mixture injection point if a carburetor or pressurized bottled or liquid fuel is used to practice the invention. A valve for the valve port is operated to admit the combustible mixture into the hollow blast-forming chamber 3. The valve is a solenoid valve in each case, although other valves may be used, such as any of a rotary, disc, poppet or drum valve or any other device that allows air, oxidizer and fuel to be injected into the chamber 3 under positive pressure and that allows for a positive shutoff between induction cycles to accommodate the ignition cycle. If necessary, increased pressure from combustion in the hollow blast-forming chamber 3 operates over an area of the valve to close the valve and limit ignition injection into the carburetor.

The blast-forming chamber 3 includes only a single annular opening at the center. This opening comprises the area between the inner housing projection 7 and the outer housing 2. The substantially restrictive opening creates a restrictive pinch point that forms a primary or first stage compression area. A high-speed convergence or secondary compression zone 9 is created at the apex of the outer housing 2 generally at the center of the annular region defining the throat and substantially along the axis of the inner and outer housings 1 and 2.

General Operation of the Shaped Charge.

The outer charge forming housing 2 is adapted to accept the introduction of a combustible mixture into the hollow blast-forming chamber 3 near the outer periphery of the base of the hollow blast-forming chamber 3. The blast-forming chamber is larger in cross-sectional area, at least relative to the throat, at the location of fuel injection and ignition. Because multiple fuel injectors 5 and igniters 4 are spaced along the periphery of the inner and outer charge forming housings 1 and 2, there are several locations within the chamber 3 at which combustion takes place. Preferably, combustion occurs at generally opposing sides of the chamber 3.

In an embodiment in which both air and oxidizers are both available, for example a combined jet/rocket engine, air is burned with fuel in sufficiently dense atmospheres to accommodate the fuel load while air is available. An air mass sensor (e.g., hot wire anomometry) or other sensor is coupled to a controller (not shown) that determines the amount of air available. The controller causes the inlet RAM port to open as air mass decreases so that sufficient oxygen enters the chamber 3. After the controller determines that air mass is too low, the air inlet stays open and the oxidizer port begins to open, causing oxidizer to enter the chamber 3. During the transitional period in which air is available but either not ideal or sufficient, both air and oxidizer are used. When the air density is too low, the outside air inlet closes and oxidizer alone is used for combustion. Thus, the device is operated aerobically in a jet mode, anaerobically in a rocket mode, or in any of combination of jet and rocket modes.

The igniters 4 and injectors 5 are located near the periphery of the blast-forming chamber 3, causing ignition to be started relatively near the periphery of the annular chamber 3. Because multiple igniters 4 are spaced around the chamber, ignition also takes place substantially simultaneously at several locations around the chamber. Each of the multiple injectors 5 simultaneously injects an appropriate amount of the combustible mixture into the chamber 3 under positive local pressure relative to the pressure inside the remainder of the hollow blast-forming chamber 3. The injector 5 is sealed or closed following the injection cycle, creating a barrier or block between the hollow blast-forming chamber 3 and the fuel and the air or oxidizer.

After sealing the injectors 5, each of the multiple igniters 4 essentially simultaneously ignites the charge of combustible mixture, causing the detonation (or pulse) along essentially the entire outer circumference of the base of the hollow blast-forming chamber 3. As the flame front or pulse advances toward the apex of the hollow blast-forming chamber 3, additional mass can be injected into the chamber 3 to increase the mass and therefore the momentum of the blast wave. Preferably, the injected mass is a safe mass such as water or an inert slurry, although the mass may alternatively be a combustible mass, including additional fuel. The explosion products are increasingly compressed by the gradual reduction in cross sectional area at the throat, or the apex of hollow blast-forming chamber 3. As the flame front advances toward the throat, primary or first stage compression is achieved by back pressure forcing the flame front essentially simultaneously into all areas of the throat. This forcing of the flame front through the throat creates a high-speed inwardly radial flow of explosion products toward the apex of the inner surface of the outer charge forming housing 2.

The high-speed explosion products stream exits the chamber through the throat and advances inwardly causing high-speed gases to converge near the inner surface 8 and at the center line 9 of the outer charge forming housing 2. The convergence creates, by the confluence of mass and kinetic energy, a secondary compression zone that forms the explosion products into hypersonic gases before their exhaustion in a controlled blast directed through the exhaust port. The resulting high pressure hypersonic exhaust E is expelled in a directed blast from the exhaust port without the need for an exit nozzle. The above description represents a single firing cycle, which is useful in many applications. The engine may alternatively be operated in a pulsed mode by repeating the above firing cycle.

The shaped charge engine is controllable using a throttle that may vary the fuel, air, and oxidizer volume. In a typical rotating disk valve that serves as a throttle, two holes are spaced 180 degrees apart to allow for injection of fuel only when the holes are aligned with the fuel lines as the disk rotates, for example at 100 RPM. As the disk rotation speed increases, the time moment of hole alignment decreases, providing a smaller amount of fuel to be injected per pulse. Conversely, decreasing the rotation rate will cause greater amounts of fuel to be injected per pulse.

Alternate Embodiments of the Shaped Charge Engine.

While the general construction and operation of the shaped charge engine of the preferred embodiment is discussed above and shown in FIG. 1, the construction may be varied, consistent with the present invention. In certain applications, it may be desirable to construct the shaped charge engine with an alternate geometric shape. For example, with reference to FIG. 2, the cross-sectional geometric shape may be varied in alternate embodiments. The generally circular or annular shape depicted in FIG. 2A corresponds to the circumference of the blast chamber 3 of the preferred embodiment shown in FIG. 1. Alternate embodiments are depicted in FIGS. 2B and 2C, showing rectangular and triangular designs, respectively.

Figure 2A:
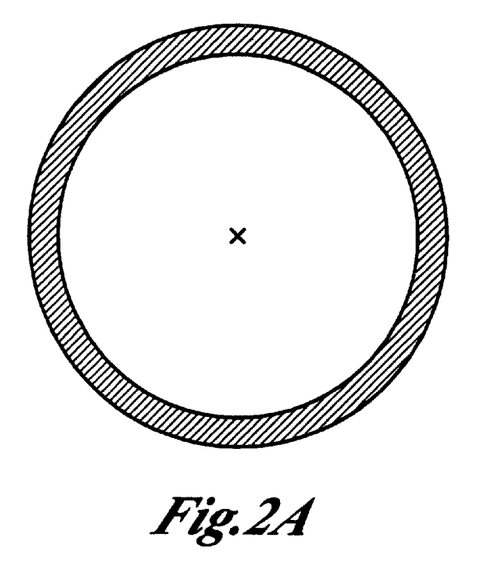
FIGS. 2A–C is a cross-sectional view of several representative shapes of a blast-forming chamber formed in accordance with the present invention.
Figure 2B:
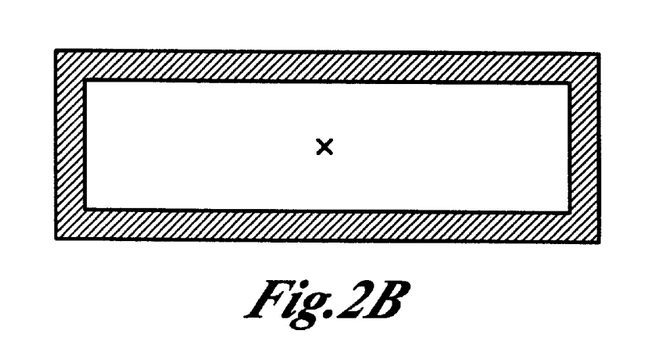
Figure 2C:
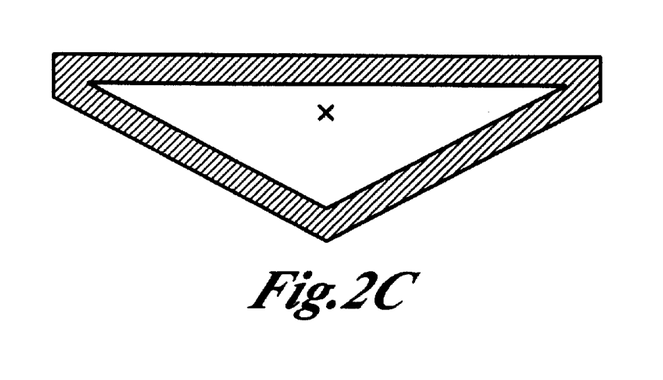

The design of the preferred embodiment, shown in FIG. 2A, is an ideal shaped charge engine having exhaust products that converge at the center simultaneously. The rectangular embodiment of FIG. 2B is somewhat less efficient but still produces exhaust products that collide substantially simultaneously because exhaust products travel like distances from opposing sides before reaching the secondary compression zone. The triangular embodiment of FIG. 2C is quite inefficient, with uneven distances from the periphery of the combustion chamber 3 to the secondary compression region, producing lower exhaust velocities and less thrust than the circular embodiment of FIG. 2A. Still other shapes of a generally convex polygonal nature may be used, consistent with this invention.

Figure 3A:
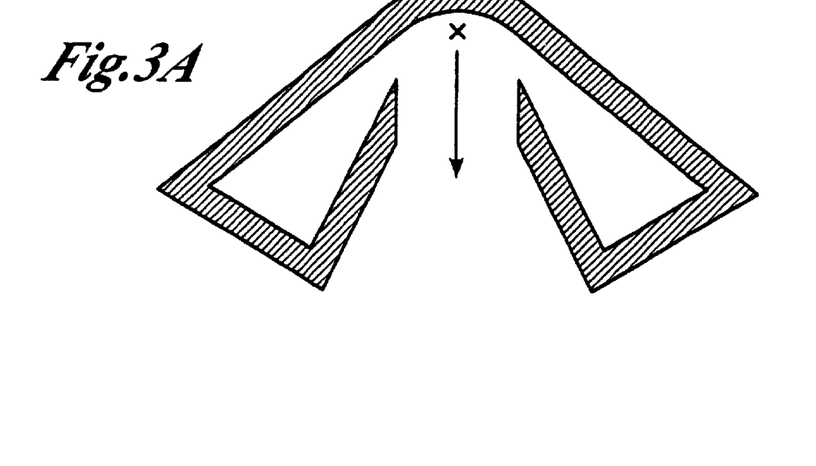
FIGS. 3A–C is a cross-sectional view of several representative orientations of a blast-forming chamber formed in accordance with the present invention.

Just as the cross-sectional shape of the blast-forming chamber 3 may be varied, so may the orientation of the blast-forming chamber be altered. The general orientation of the preferred embodiment is depicted in FIG. 3A. In the embodiment of FIG. 3A (which may be characterized as "concave"), the exhaust products travel toward the throat from a point generally upstream of and somewhat orthogonal to the final exhaust direction. As the exhaust products pass through the throat, they collide with the outer housing 2 and gases emerging from opposite sides at the secondary compression zone, producing hypersonic exhaust in a direction somewhat opposite the direction of travel through the throat.

Figure 3B:
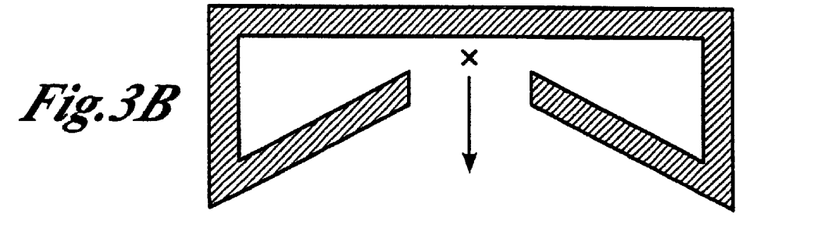
Figure 3C:
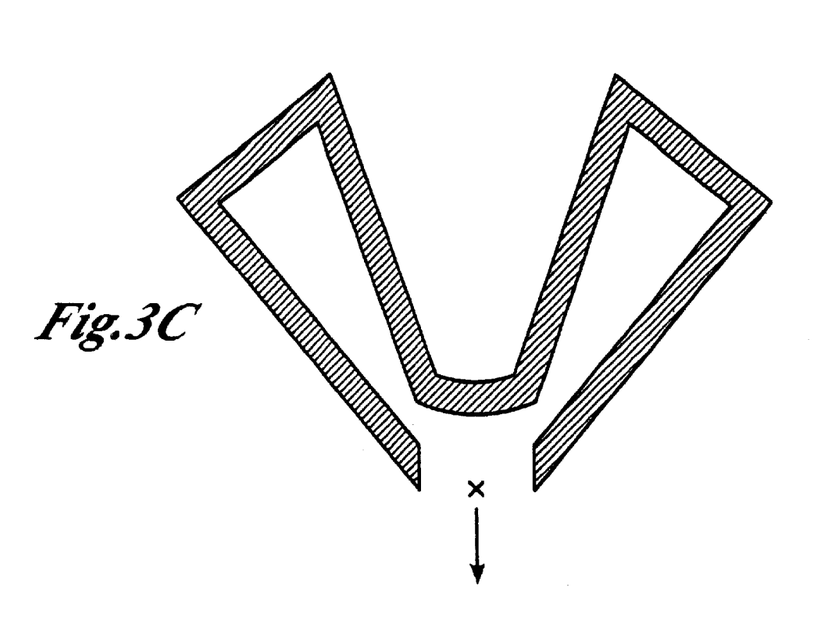

In an alternate embodiment, as depicted in FIG. 3B, the blast-forming chamber is substantially flat, so that the exhaust products travel through the throat in a direction generally orthogonal to the final exhaust direction. In yet another embodiment, as depicted in FIG. 3C, the blast-forming chamber is in a convex configuration, so that the exhaust products travel through the throat in a direction that forms an obtuse angle with the final exhaust direction. Likewise, additional orientations not depicted in FIG. 3 are possible.

Among the three embodiments depicted in FIG. 3, the embodiment of FIG. 3A can be considered a high pressure spike motor. The change in direction of the exhaust gases just beyond the throat causes "thermal stacking" of the gases just prior to exit. The result produces a powerful but brief spike of thrust as the gases exit the engine. While the total masses of exhaust products are the same in each embodiment, the thrust characteristics differ. Thus, the embodiment of FIG. 3B will produce a relatively weaker, longer thrust moment, while the embodiment of FIG. 3C will produce a more even exhaust flow with a relatively smaller spike.

Depending on the environment and desired performance, it may be useful to construct a single engine in which the blast chamber orientation can be dynamically varied from a convex orientation (such as in FIG. 3C) to a concave orientation (such as in FIG. 3A). In the preferred embodiment, particularly when used as a pulse jet/rocket engine as discussed further below with reference to FIG. 5, the shaped charge engine may be hinged and dynamically adjustable to create varying blast chamber orientations.

With reference again to FIGS. 3A–C, outer housing hinge points H1, H2 are indicated at locations that allow for adjustment of the orientation of the shaped charge engine. Thus, by pivoting the outer housing 2 at the location of the outer housing hinge points H1, H2, the orientation of the shaped charge engine may be changed along a continuum from a generally convex orientation (such as in FIG. 3C) to a concave orientation (such as in FIG. 3A). Because the blast chamber 3 is preferably a continuous annular ring, the inner and outer housings 1, 2 comprise a series of plates arranged to slide over and under one another as the configuration changes. Alternate constructions are also possible, including for example a combustion chamber that comprises a plurality of separate sub-chambers that are adjoining or early adjoining one another at the most concave and convex positions (as in FIGS. 3A and 3C) but that are spaced relatively farther apart from one another in the more horizontal configurations as in FIG. 3B.

Figure 4A:
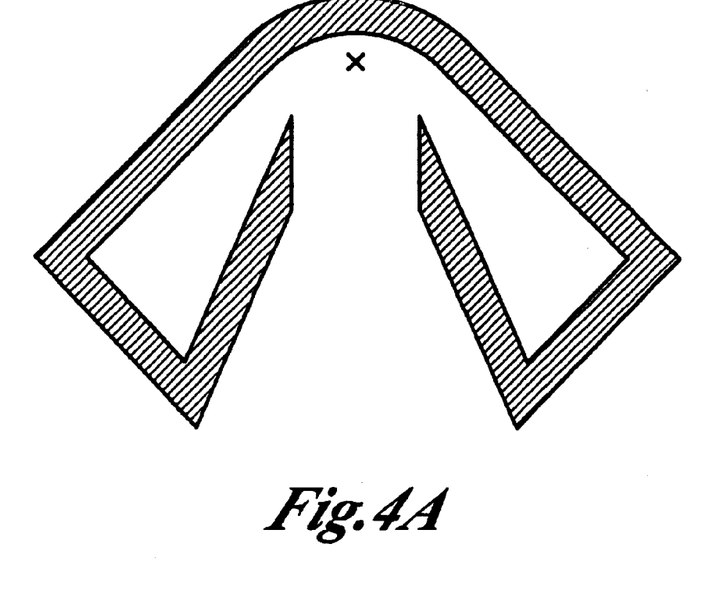
FIGS. 4A and 4B are a cross-sectional view of two alternate configurations for the throat of an engine formed in accordance with the present invention.
Figure 4B:
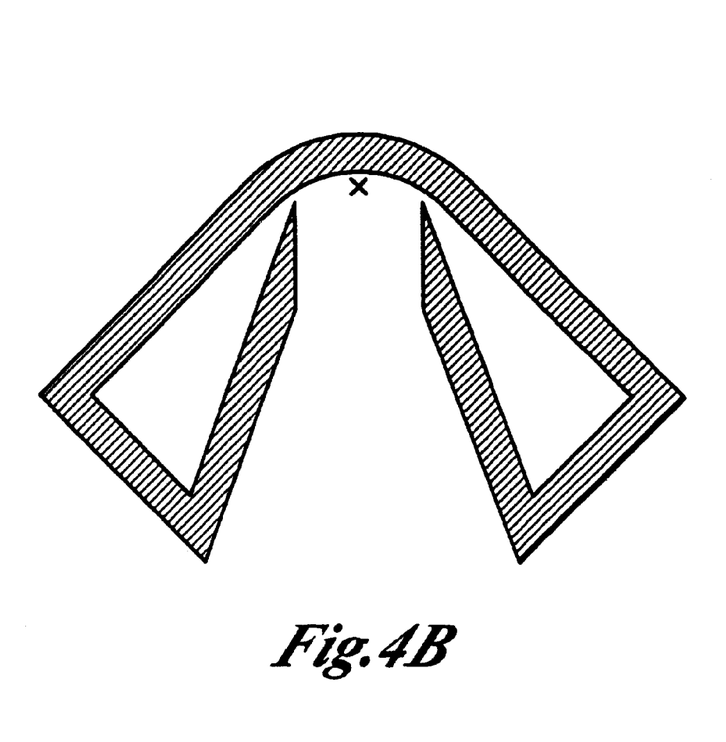

The throat area may also be varied, consistent with the invention. With reference to FIG. 4, two alternate embodiments are shown. In FIG. 4A, a low pressure engine is shown having a relatively larger throat. Alternatively, the embodiment of FIG. 4B includes a relatively smaller throat. Relative to the engine of FIG. 4B, the engine of FIG. 4A will create lower pressure in the combustion chamber 3, lower velocities through the throat, and a smaller spike in exhaust velocity and thrust.

Again with reference to FIGS. 3A–C, outer housing hinge points H3, H4 are indicated at positions that allow the inner housing 1 to be adjusted swing closer or farther from the outer housing 2. Thus, as the inner housing 1 is pivotally moved toward the outer housing 2, the size of the throat is decreased, producing a smaller "pinch point." Conversely, the inner housing 1 can be rotated outward, away from the outer housing 2, producing a larger throat. In the case of both the adjusted orientation and adjusted throat area, the hinging action is best accomplished by hydraulics, screw-drive, or other such devices that can move metal plates and withstand the substantial pressures produced in the blast-forming chamber 3.

Use as a Switchable Pulsed Jet/Rocket Engine.

Figure 5:
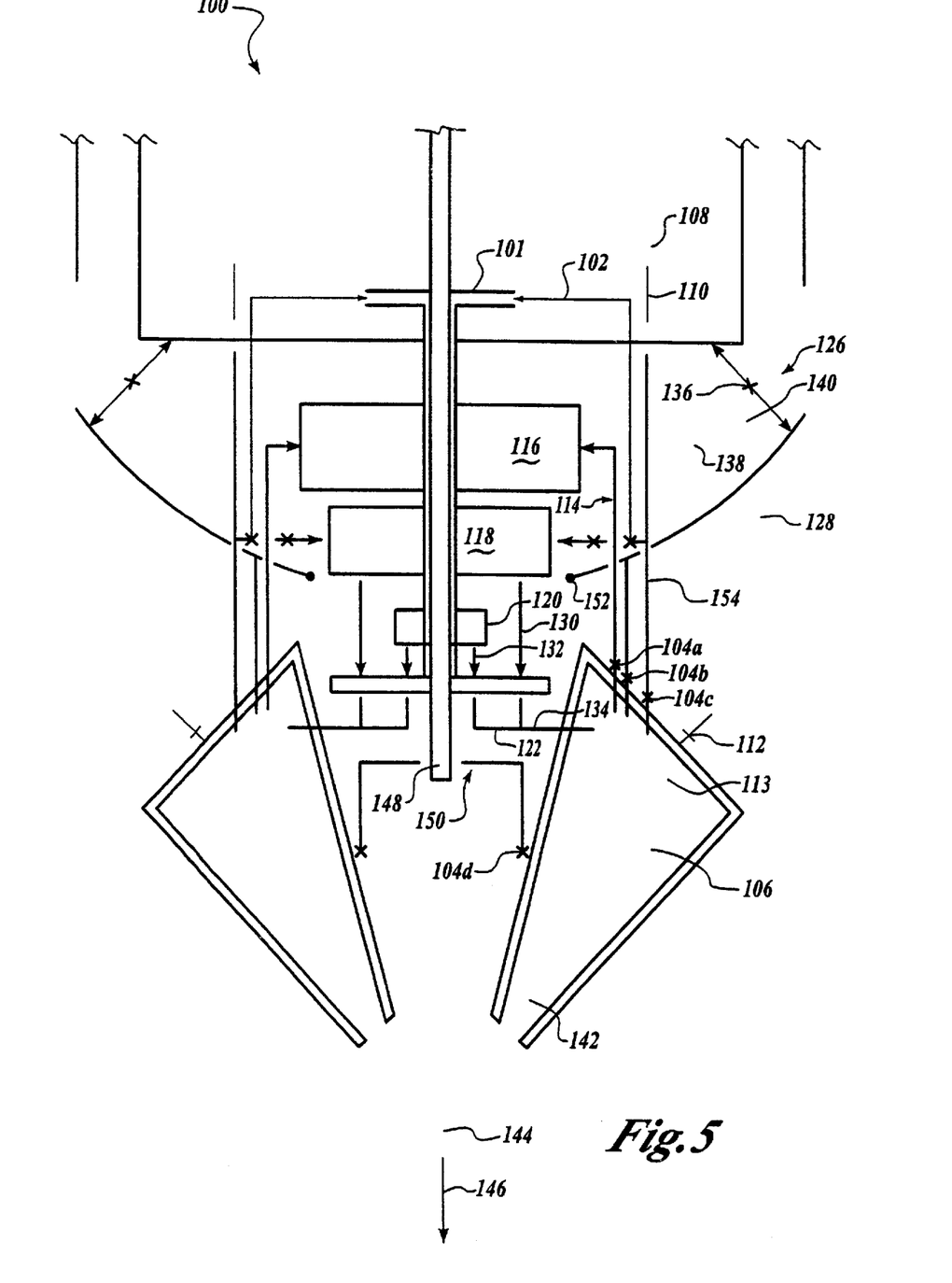
FIG. 5 is a representative view of a switchable jet and rocket engine formed in accordance with the present invention.

A presently preferred application of the shaped charge engine is depicted in FIG. 5, which schematically illustrates a switchable pulsed jet/rocket engine. The switchable pulsed jet/rocket engine of FIG. 5, generally indicated by reference numeral 100, includes a shaped charge engine in accordance with that of FIG. 1, although it is shown in a concave orientation as in FIG. 3 C.

The engine begins operation from a cold start at low altitudes in a pulsed jet mode. Pulses of fuel and oxidizer are fed from sources of fuel 101 and oxidizer 108 to the shaped charge combustion chamber 106 via separate fuel and oxidizer lines 102, 110, each of which is controlled by a solenoid valve 104a, 104b. An igniter 112 ignites the fuel and oxidizer mixture, creating a blast and attendant high pressure within the chamber 106. When the rotary valve is in use (principally in jet mode), the igniter is controlled by a fixed timing ignition device such as, for example, points typically found in an automobile distributor, magneto or battery assisted magnetic pickups, or light sensitive relays. When direct fuel and oxidizer injection are used (in rocket mode), the igniter is controlled by computer processor initiated timing pulses.

By opening a solenoid valve 104c on an exhaust bypass line 114, pressurized exhaust products are allowed to flow to an exhaust-driven turbine 116, causing it to rotate. The exhaust-driven turbine 116 is connected to a compressor 118, a fuel pump 120, and a centrifugal throttle valve 122, each of which is configured to rotate together as a unit. While an ordinary rotating disk may be used consistent with this invention, in the preferred embodiment the centrifugal throttle valve 122 (discussed in greater detail below with reference to FIG. 7) is used to provide superior control, particularly in fixed inlet pressure conditions. As the unit rotates, compressed air 126 collected via an air scoop 128 is delivered through an air line 130 while fuel is delivered via a fuel line 132 to the centrifugal throttle valve 122. The centrifugal throttle valve 122 allows air and fuel to pass through the valve by opening and closing multiple apertures that are cyclically aligned and mis-aligned as it rotates.

Fuel and air, after passing through the centrifugal throttle valve 122, are mixed in a mixing manifold 134 and injected into the shaped charge combustion chamber 106 when the centrifugal throttle valve 122 is opened. The centrifugal throttle valve 122 then closes and the igniter 112 ignites the fuel and air (or oxidizer) mixture within the chamber 106 at an ignition point 113. The detonation causes exhaust products to travel out the chamber 106.

Figure 7A:
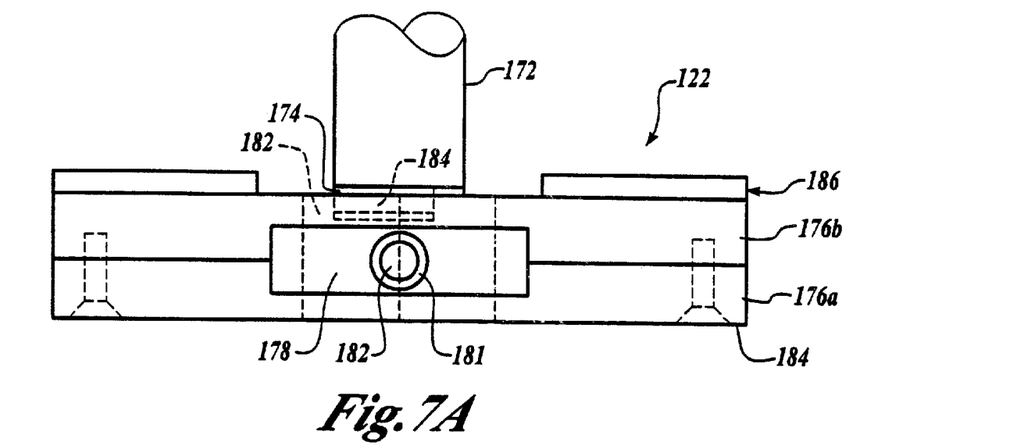
FIG. 7A is a side view of a rotary centrifugal throttle valve formed in accordance with the present invention.
Figure 7B:
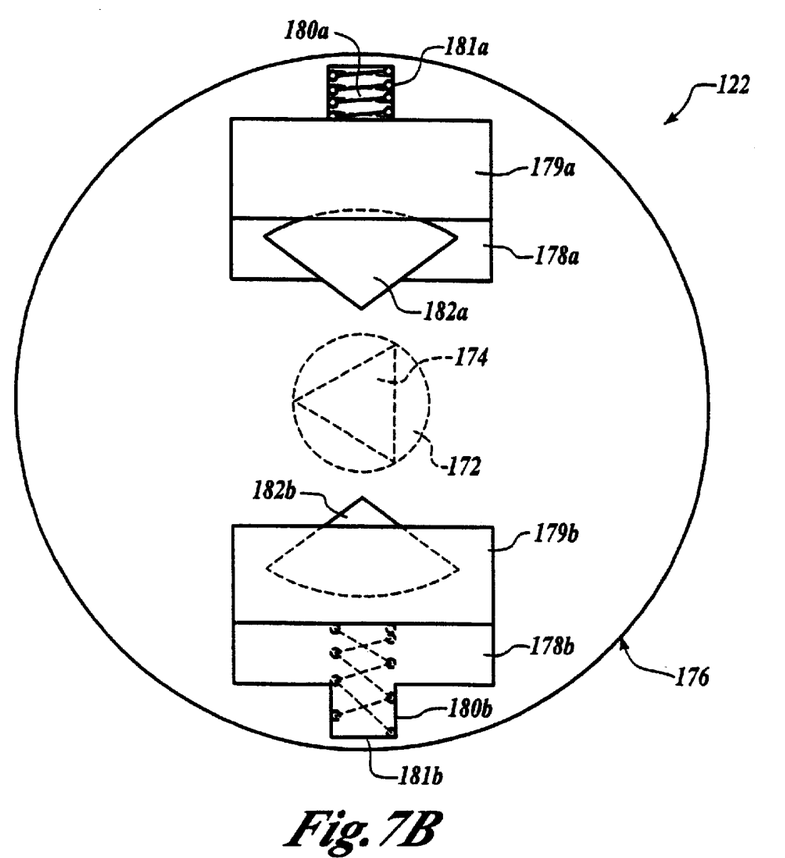
FIG. 7B is a top view of rotary centrifugal throttle valve formed in accordance with the present invention.

The preferred centrifugal throttle valve is shown in side view in FIG. 7A and plan view in FIG. 7B. Previous rotary disk valves having fixed opening sizes such as are used in prior variable firing rate engines suffer many problems, regardless of the size or shape of the openings. For example, if the port is sized for low rate firing then the time during which the openings are aligned decreases as rotation increases, allowing less air, fuel, or mixture to pass through the valve per pulse. Consequently, higher inlet pressure is required to obtain the correct charge volume. On the other hand, if the port is sized for high rate firing, then at low firing rates the disk spins slower, the holes are aligned for longer periods, and an excess amount of air, fuel, or mixture is allowed to pass through the valve. In order to compensate for the excess and obtain the correct charge volume, lower inlet pressures and controls are required.

The rotary centrifugal throttle valve 122 overcomes these problems and allows for correct charge volumes at all firing rates while using a fixed inlet pressure. The centrifugal throttle valve 122 includes a driveshaft 172 having a projection 174 and a disk valve housing 176 mounted on the driveshaft 172. The disk valve housing 176 comprises two halves 176a, 176b joined together in conventional means such as welding, lamination, bolts, or screws 184. The two halves 176a, 176b of the disk valve housing 176 include recessions that, when the halves are joined, together form inner pockets 178a, 178b. The disk valve housing 176 also includes one or more openings 182a, 182b passing through the disk valve housing 176 substantially overlying the inner pockets. A sliding valve 179a, 179b is retained within each of the pockets 178a, 178b. A further recession within the two halves 176a, 176b of the disk valve housing forms spring pockets 181a, 181b that retain springs 180a, 180b associated with each sliding valve 179a, 179b. Other devices may be used in the place of the springs 180a, 180b to bias the sliding valves 179a, 179b in a closed position at slower rotation speeds, including other resilient materials or compression devices. Still further, the sliding valves 179a, 179b may be electronically controlled using hydraulics, worm-drives, or other mechanisms to open and close the valves as a function of rotation rate. While the centrifugal throttle valve 122 is illustrated as having two openings 182a, 182b, any number of openings may be used, consistent with the invention. Likewise, the openings 182a, 182b are illustrated as having a generally "pie" shape, but may be round, square, or any other shape.

With reference more particularly to FIG. 7B, the operation of the centrifugal throttle valve is illustrated, representationally both at high and low firing rates. At low firing rates, the disk valve housing 176 rotates at a relatively lower rate, causing the spring 180b to urge the sliding valve 179b in a direction radially inward within the pocket 178b. By moving toward the center of the disk valve housing 176, the sliding valve 179b covers a substantial portion of the opening 182b, limiting the amount of air, fuel, or mixture that may pass through to the combustion chamber. Note that the openings 182a, 182b are preferably formed so that the sliding valves 178a, 178b cannot fully cover them even when the centrifugal throttle valve 122 is stopped or at its slowest rate of rotation. This arrangement allows air, fuel, or mixture to reach the combustion chamber during start-up and prevents the engine from stalling at the lowest firing rates.

At relatively higher firing rates, centrifugal forces cause the sliding valve 179a to compress the spring 180a farther within the spring housing 181 a. The recession of the spring radially outwardly uncovers a substantial portion of the opening 182a, allowing a greater amount of fuel, air, or mixture to pass through to the combustion chamber. In any particular application, the throttle valve may be tailored by substituting springs of greater or lesser resistance, altering the opening size or shape, locating the openings farther inward or outward along the disk housing radius, or increasing or decreasing the number of openings on the disk valve housing 176.

While the above discussion and illustration in FIG. 7B depicts one opening 182a substantially uncovered by the sliding valve 179a as would be the case at a high firing rate, and one opening 182b substantially covered by the sliding valve 179b as would be the case at a low firing rate, this condition is shown on a single valve only for ease of illustration and discussion. In practice, each of the openings 182a, 182b would b e covered or uncovered by the sliding valves 179a, 179b to substantially the same extent at all times.

The projection 174 on the driveshaft 172 is shown as a triangle shape, offset from the center of the driveshaft 172. The projection 174 may alternatively be of any shape, although an irregular shape is preferred to prevent joining the driveshaft 172 to the disk housing 176 out of phase with ignition or other external parts that require timing. The driveshaft 172 is joined to the disk housing 176 by inserting the projection 174 into a similarly shaped recession 184 within the disk housing 176. The projection 174 and recession 184 are configured to allow the projection 174 to slide within the recession 184, permitting the disk housing 176 to move inward or outward along the shaft 172. A thrust washer 186 absorbs the force imparted on the disk housing 176 and ensures a tight seal. This construction allows the centrifugal throttle valve to absorb substantial pressures without damaging the drive motor or other components. Moreover, the sliding arrangement of the projection 174 within the recession 184 allows for wear on the thrust washer.

As the turbine 116, compressor 118, fuel pump 120, and centrifugal throttle valve 122 continue to rotate, pulses of the fuel and air mixture are continually produced and ignited as described above. The solenoid valve 104c associated with the exhaust bypass line 114 is modulated (or pulsed) to produce the desired idle speed of the turbine and the engine itself.

The air scoop 128 is opened or closed automatically via a linear actuator 136. The linear actuator 136 is controlled by an air mass sensor 138 that, as discussed above, determines the air mass available. In the preferred embodiment, the air mass sensor 138 essentially comprises a heated wire that decreases in temperature as increased air mass flows over the wire during flight. The temperature of the wire is read by a processor (not shown) to determine the magnitude of the existing air mass. Thus, the linear actuator 136 can, for example, open the air scoop 128 when the air mass sensor 138 senses a reduced air mass available, causing more air volume to enter the intake air plenum 140.

With the engine at idle, the switchable pulsed jet/rocket is ready to transition to a pulse jet mode of operation in which substantial thrust is produced. The solenoid valve 104c on the exhaust bypass line 114 is opened substantially fully, allowing more exhaust gas to flow through the line to drive the turbine 116, causing it to rotate faster. In turn, the compressor 118, fuel pump 120, and centrifugal throttle valve 122 rotate faster. Because of the centrifugal forces produced by the faster rotation, the centrifugal throttle valve 122 automatically opens the valve aperture opening to allow higher air and fuel flows required at rapid pulse rates.

The high pulse rate fuel and air charges that are ignited by the timed ignition of the igniter 112 causes detonation wave exhaust streams to flow from the ignition point 113 within the combustion chamber 106. The exhaust streams flow through the low pressure pinch point at the throat 142 and converge at a secondary high pressure compression point 144 from which they exit as a high pressure hypersonic exhaust flow in the direction of the arrow 146. The engine is now operating at the highest thrust setting possible using air and fuel as the inertial mass (and without altering the shape or orientation of the combustion chamber 106).

Greater thrust can be obtained by adding additional mass to the combustion chamber 106. As noted previously, the additional mass is preferably a safe mass such as water or an inert slurry. The additional mass products from the mass injection manifold 148 are injected into the chamber 106 by opening a solenoid valve 104d located on an additional mass line 150. The additional mass is injected into the chamber 106 between pulses and prior to firing of the igniter 112. The exhaust stream automatically accelerates the additional mass out the chamber 106. The engine is now at an ultra-high thrust setting; that is, the maximum thrust that can be achieved using fuel, any combination of air and oxidizer, and added mass to produce thrust in the configuration and orientation of the engine.

As the atmosphere thins, the pressure in the air intake plenum 140 diminishes and is sensed by the air mass sensor 138. The air scoop 128 is automatically opened by extending the linear actuator 136, causing the air scoop 128 to pivot on a hinge point 152. The additional volume of air increases the pressure in the plenum 140 to satisfy the oxygen requirements of the engine until the air scoop 128 is opened to its widest position. As the atmosphere thins further, the air scoop cannot admit a greater flow of air. A computer controller (not shown) coupled to the air mass sensor 138, upon determining that the air scoop 128 is open at its widest and the air is too thin, causes one or more oxidizer valves 154 to open to allow oxidizer to flow into the chamber 106. While the oxidizer valves 154 are preferably driven by a controller containing a processor, they may alternatively be driven directly by proximity switches associated with the air mass sensor 138 and linear actuator 136. The oxidizer valve 154 allows an increasing amount of oxidizer to be injected into the blast chamber 106 as the atmosphere thins even further.

When no air or atmospheric pressure is sensed by the air mass sensor 138, the engine operates in an anaerobic mode essentially as a space vehicle. The solenoid valve 104c on the exhaust bypass line 114 closes, causing the turbine 116, compressor 118, fuel pump 120, and centrifugal throttle valve 122 to stop rotating. Likewise, because there is no air available, the air intake scoop 128 is closed by retracting the linear actuator 136.

Fuel and oxidizer are fed directly to the combustion chamber 106 via the fuel line 102 and oxidizer line 110 by timed pulses of the solenoid valves 104a, b. All other operations of the ignition, injection of mass, and exhaust are the same as in the air-breathing mode of operation.

When air becomes available as the engine descends, the air mass sensor 138 detects the increased presence of air and allows the air scoop 128 to open so that an aerobic, or jet, mode of operation can again take place.

Hinged and gimbaled operation. In the preferred embodiment of the present invention, the shaped charge engine is hinged so that the orientation of the combustion chambers can be dynamically altered during flight. Such a construction is discussed above with reference to FIGS. 3A–C.

In addition, the engine can be gimbaled to allow the direction of the exhaust products to be controlled. The outer engine is pivotally mounted on the air/space craft so that the exhaust stream can be directed. By pivoting the engine, and therefore the exhaust stream, the engine itself provides directional control. In alternate embodiments, the blast-forming chamber 3 may be pivotally mounted while the remainder of the propulsion and control system is fixed. In still another alternate embodiment, directional control can be obtained by adjusting the inner and outer housing hinges H1, H2, H3, H4 in an asymmetrical fashion. Thus, for example, the outer housing hinges H1, H2 can be adjusted to produce a blast-forming chamber having opposing sides that are in slightly different orientations. Likewise, for example, the inner housing hinges H3, H4 can be adjusted to produce a throat that is imbalanced on opposing sides. In either configuration, the exhaust stream will be directed off-center, providing directional control.

Use as a Pulse Driver for Other Vehicles.

Figure 6:
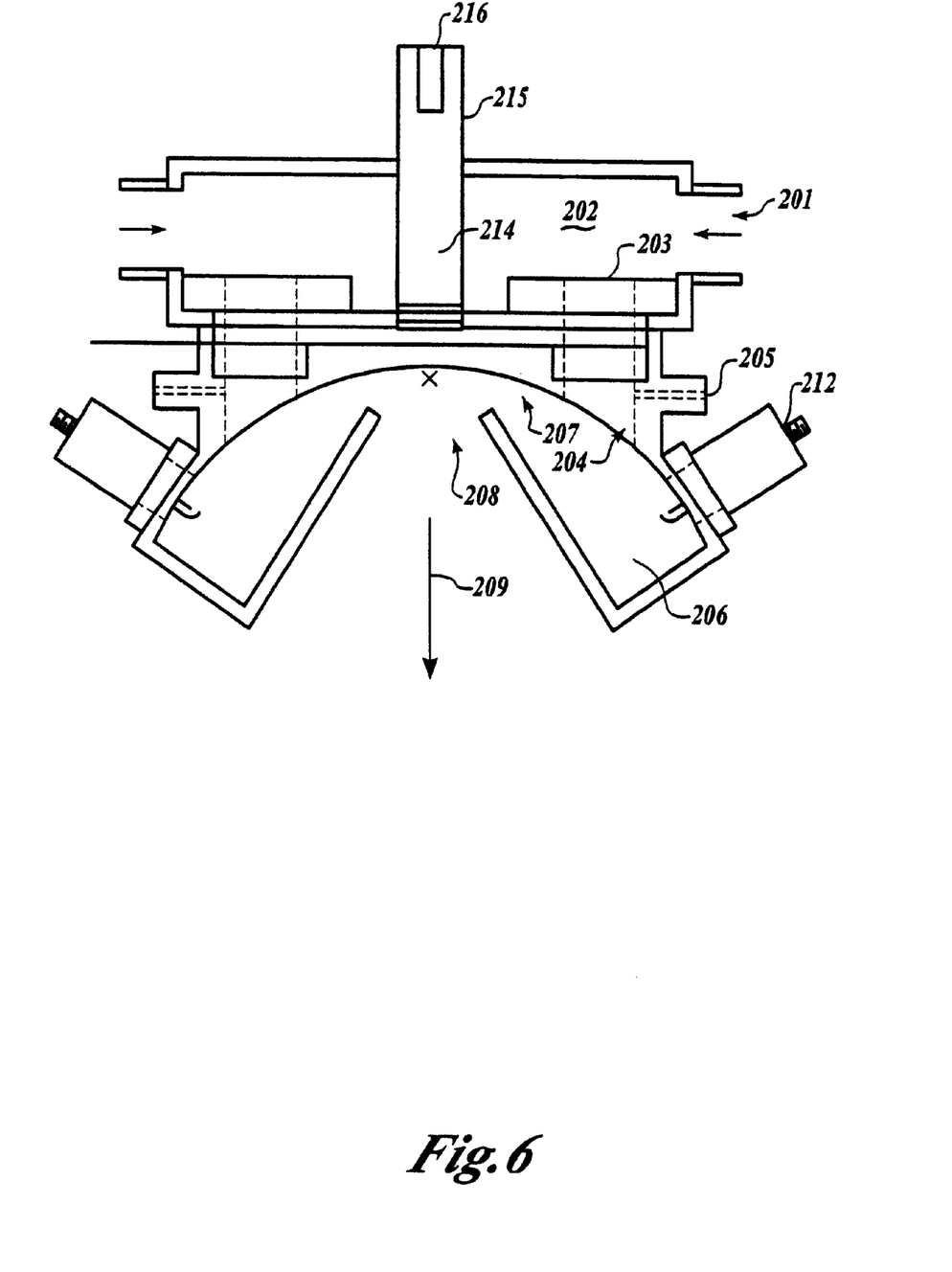
FIG. 6 is a representative view of a pulse driver engine formed in accordance with the present invention.

While the shaped charge engine of this invention is described above as suitable for air-breathing and non-air-breathing applications, it can also be adapted for use in applications that always have air available. For example, the shaped charge engine may propel a car or boat, may be used in a tool or as a generator, or may be used in many other applications that will have air available. The general construction of the shaped charge engine for use in such atmospheric conditions is shown in FIG. 6. The atmospheric engine includes one or more air intake ports 201 leading to a compressor 202. The compressed air is passed through air outlet ports 203 to the combustion chamber 206 via engine air inlet ports 204. Fuel from a fuel source (not shown) is injected via fuel injectors 205.

In the same manner as discussed above, the engine includes a primary low pressure pinch point at the throat 207 leading to a secondary high compression point 208 that produces a high pressure exhaust stream 209. The fuel and air mixture is ignited by an igniter 212 that is illustrated as a spark plug. A drive motor (not shown) is connected to a drive shaft 215 via a key way or spline 216. In turn, a valve drive extension 214 on the drive shaft 215 is connected to a rotary centrifugal throttle valve that operates as described above with reference to FIG. 8.

The primary difference between the shaped charge engine of FIG. 6 and the pulsed jet/rocket engine of FIG. 5 is the inclusion of oxidizer and the ability to open and close air intake scoops. In all other relevant respects, the engines of FIGS. 5 and 6 are constructed and operate in a similar manner.

Use as a Turbine Driver.

The shaped charge engine has been described above as a direct propulsion device. Alternatively, the high compression, high inertia exhaust stream can drive fixed cycle or free spinning turbines such as those of the Pelton or axial flow type. One example of a detonation cycle turbine engine is shown in U.S. Pat. No. 6,000,214 to Scragg. Scragg discloses a turbine rotor driven by the exhaust ports of two combustion chambers on opposite sides of the rotor. The torque produced by the acceleration and rotation of the turbine is put to work in conventional electrical or mechanical means.

Similarly, the exhaust of a single or any number of shaped charge engines can be directed toward a turbine. Because the shaped charge engine of the present invention is far more efficient, however, it produces a much improved turbine-driving engine.

Other Uses of the Shaped Charge.

As discussed above, the shaped charge engine may be used to propel an aircraft, preferably including an aircraft that may travel in both atmospheric conditions, space conditions, or both. Further, the engine may be used as a direct exhaust drive to propel a personal watercraft, boat, or other vehicle, or may be configured to drive a turbine to propel a car, boat, motorcycle, or other vehicles. In addition, the engine may be used as a bow thruster for boats, ships, or submarines.

In addition to propelling vehicles, the blast or pulse produced by the shaped charge engine is useful in a host of other applications. For example, the shock waves produced by the engine can be used for underground rodent and pest extermination or the control of insects. The shock wave from a single pulse may be used in avalanche control to initiate movement of the potential avalanche, eliminating the need for artillery or explosives.

The shaped charge may also be used for a variety of demolition purposes. For example, it may be used as a rock breaker, to demolish buildings, to fracture rocks in mining, to core and break concrete, or to remove ice from ships, bridges, or roads. In addition, the shaped charge may have military uses as a mine that is both powerful and reusable. Ideally, the material is fragmented by directing one or more shock waves toward it. Moreover, the demolition devices constructed using the present shaped charge invention may be recovered and reused, unlike conventional demolition devices.

A wide range of tools may be created using the shaped charge engine of the present invention. For example, the enormous shock waves produced may be put to use as a jackhammer or other impact tool, or may be focused to produce cutting and etching devices. Hot paint, foam, or metal may be sprayed in an alternate embodiment of the present invention in which paint, foam, or metal is used as the additional mass injected into the blast chamber after ignition. Precisely focused and directed shaped charges may also be used in tree limb removal or weed trimming. Still further, the hot, powerful blasts may be put to use as a burner (such as in a furnace or boiler) or to remove snow from driveways, rooftops, or other locations. Moreover, hot, high pressure exhaust gases may be used to strip paint, varnish, and similar coatings.

In still further applications, a single pulse creates instant heat and pressure for differential pressure forming of metal without the necessity of pre-heating the metal and without requiring compressors or other pressure storage devices. Similarly, pulses may be used to form materials by direct injection devices.

By placing projectiles in the exhaust stream, the shaped charge engine can be used as a high-speed gun. Preferably, a gun barrel or similar launch tube extends from the exhaust port so that the exhaust stream will propel the projectile in a controllable, straight path.

In a closed system, the shaped charge engine may be used to create and maintain pressure, adjusting the magnitude and rate of pulsing to control the pressure. Alternatively, when configured to drive a turbine, the shaped charge engine may form a generator to produce electricity.

Results from Actual Embodiments.

As discussed above, serial infusion and ignition of multiple charges of combustible mixture into the hollow blast-forming chamber allow the detonation to be formed in a pulsed manner. The pulse strength and/or frequency is dynamically controlled during operation by varying the quantity and rate of infusing and igniting the serial charges of combustible mixture. Tests of an actual embodiment using the pulsed operation of the hypersonic exhaust stream indicate that operating cycles over 100 Hz and exhaust gas velocities as high as 30,000 feet per second are possible. Thus, independent variation is possible between gentle and powerful pulses and between slow and fast pulse.

As a pulsed jet or rocket engine for aerial vehicles, exhaust gas speeds higher than possible with conventional turbine or rocket propulsion units allow for smaller, lighter drives with fewer moving parts while potentially eliminating turbine blades, compressors, and exhaust nozzles. The pulsed hypersonic exhaust stream also reduces engine cooling requirements by providing pulsed rather than continuous operation. The rapid burning and detonation assist in engine cooling by converting the chemical energy of the combustible mixture quickly into high pressure with little wasted heat. This complete combustion also allows a higher efficiency of the engine and lower fuel use per pound of thrust produced.

An actual embodiment of the present invention has been constructed and tested against a variety of other engines, demonstrating the superior results. An engine capable of delivering 200 horse power (hp) constructed according to U.S. Pat. No. 6,000,214 to Scragg weighs approximately 262 pounds and can produce 0.76 hp per pound of engine weight. An actual embodiment of the present invention that can deliver more than 200 hp weighs only 70 pounds and produces 2.86 hp/pound. The shaped charge engine is also many times smaller, having a combustion chamber of 18 cubic inches compared with 560 cubic inches in a Scragg engine.

The advantages over gasoline, diesel, and Brayton cycle engines are also substantial. In comparison to the actual 200 hp embodiment discussed above, equivalent 200 hp gasoline, diesel, and Brayton engines can produce only 0.40, 0.22, and 1.0 hp/pound, respectively, and weigh approximately 500, 900, and 200 pounds. Consequently, an engine according to the present invention produces significantly more power at a much smaller size and weight than previous engines.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A shaped charge engine, comprising:
   an inner housing;
   an outer housing joined to the inner housing to define a blast-forming chamber;
   a plurality of fuel injectors adapted to inject fuel into the chamber at generally diametrically opposite locations; and
   a central opening in the blast-forming chamber between the inner and outer housings defining a primary convergence zone;
   whereby exhaust gases traveling through the primary convergence zone from generally opposite locations collide at a secondary convergence zone substantially at the center of the shaped charge engine to produce a hypersonic exhaust; and,
   wherein the inner and outer housings are constructed of a non-circular, polygonal cross-sectional shape from a perspective orthogonal to the exhaust direction.

2. The shaped charge engine of claim 1, wherein the blast-forming chamber is comprised of a plurality of generally opposed regions, each of which includes a fuel injector and igniter.

3. The shaped charge engine of claim 1, further comprising a plurality of igniters extending at least partially into the chamber and a source of oxygen, whereby a spark or flame from the igniters causes fuel ignition.

4. The shaped charge engine of claim 3, further comprising a mass injector projecting at least partially into the chamber and connected to a mass source, the mass injector adapted to inject mass into the chamber following fuel combustion.

5. The shaped charge engine of claim 3 wherein the mass comprises water.

6. The shaped charge engine of claim 4, wherein the source of oxygen comprises separate sources of air and oxidizer.

7. The shaped charge engine of claim 6, further comprising a sensor to detect the available presence of air mass and a controller in communication with the sensor to adjust the delivery of oxygen to the chamber from all air to all oxidizer or a mixture of air and oxidizer.

8. A shaped charge engine, comprising:
   an inner housing;
   an outer housing joined to the inner housing to define a blast-forming chamber;

a plurality of fuel injectors adapted to inject fuel into the chamber at generally diametrically opposite locations; and a central opening in the blast-forming chamber between the inner and outer housings defining a primary convergence zone;

whereby exhaust gases traveling through the primary convergence zone from generally opposite locations collide at a secondary convergence zone substantially at the center of the shaped charge engine to produce a hypersonic exhaust;

wherein the blast-forming chamber is comprised of a plurality of generally opposed regions, each of which includes a fuel injector and igniter; and, further wherein the generally opposed regions are pivotable in the vicinity of the apex of the outer housing to enable the orientation of the sub-chambers to be varied between a position that directs initial exhaust products in a direction at an obtuse angle with the direction of final exhaust through a position that directs initial exhaust products in a direction at an acute angle with the direction of final exhaust.

9. The shaped charge engine of claim 8 herein the inner housing further comprises projections adjustably attached to the inner housing so that the projections may be moved toward or away from the outer housing to decrease or increase the size of a pinch point defining the primary convergence zone.

10. The shaped charge engine of claim 8, further comprising a plurality of igniters extending at least partially into the chamber and a source of oxygen, whereby a spark or flame from the igniters causes fuel ignition.

11. The shaped charge engine of claim 10, further comprising a mass injector projecting at least partially into the chamber and connected to a mass source, the mass injector adapted to inject mass into the chamber following fuel combustion.

12. The shaped charge engine of claim 10 wherein the mass comprises water.

13. The shaped charge engine of claim 11, wherein the source of oxygen comprises separate sources of air and oxidizer.

14. The shaped charge engine of claim 13, further comprising a sensor to detect the available presence of air mass and a controller in communication with the sensor to adjust the delivery of oxygen to the chamber from all air to all oxidizer or a mixture of air and oxidizer.

15. The shaped charge engine of claim 8, wherein the inner housing is generally annular in shape and includes a substantially conical projection that, together with the outer housing, forms the primary convergence zone.

16. The shaped charge engine of claim 8, wherein the outer housing is substantially dome-shaped.

* * * * *